(12) United States Patent
Siladi

(10) Patent No.: US 8,523,093 B1
(45) Date of Patent: Sep. 3, 2013

(54) SYSTEM FOR SEPARATING A PLASTIC WASTE FROM A PAPER WASTE

(76) Inventor: Liviu Siladi, Phoenix, AZ (US)

( * ) Notice: Subject to any disclaimer, the term of this patent is extended or adjusted under 35 U.S.C. 154(b) by 239 days.

(21) Appl. No.: 13/086,785

(22) Filed: Apr. 14, 2011

(51) Int. Cl.
*B02C 19/00* (2006.01)

(52) U.S. Cl.
USPC .................. 241/24.18; 241/24.19; 241/24.28; 241/79; 241/79.1

(58) Field of Classification Search
USPC ................. 241/24.18, 24.19, 24.28, 79, 79.1
See application file for complete search history.

(56) References Cited

U.S. PATENT DOCUMENTS

| | | | |
|---|---|---|---|
| 3,757,946 A | 9/1973 | Berkowitz et al. | |
| 3,848,813 A | 11/1974 | Stanczyk et al. | |
| 4,034,862 A * | 7/1977 | Bahri et al. | 209/11 |
| 4,160,722 A | 7/1979 | Marsh | |
| 4,314,674 A * | 2/1982 | Cerroni | 241/14 |
| 4,379,748 A * | 4/1983 | Hoogendoorn | 209/11 |
| 4,440,635 A * | 4/1984 | Reiniger | 241/19 |
| 4,561,860 A | 12/1985 | Gulley et al. | |
| 4,586,659 A | 5/1986 | Easter, II | |
| 4,760,717 A * | 8/1988 | Ponzielli | 68/181 R |
| 5,307,998 A * | 5/1994 | Buck et al. | 241/3 |
| 5,797,549 A * | 8/1998 | Williams | 241/46.01 |
| 6,136,590 A | 10/2000 | Kruse | |
| 6,629,653 B2 | 10/2003 | Fahrbach et al. | |
| 7,325,757 B2 * | 2/2008 | Allen et al. | 241/19 |
| 2005/0051646 A1 * | 3/2005 | Horne | 241/23 |

* cited by examiner

*Primary Examiner* — Dana Ross
*Assistant Examiner* — Onekki Jolly

(57) ABSTRACT

A system for separating a plastic waste from a paper waste comprising a first fan which draws air toward the first chamber, the second fan blows air up the third tunnel from the lower third tunnel end toward the upper tunnel end, the third fan draws air into the second cyclone, wherein to separate the plastic waste from the paper waste in the mixed-paper-and-plastic.

8 Claims, 3 Drawing Sheets

SHOWN WITH A PARTIAL CUT-OUT SECTION TO SEE THE AIR GUIDES, STAGE #1, STAGE #2

SIDE VIEW

SYSTEM FOR SEPARATING A PLASTIC WASTE FROM A PAPER WASTE

BACKGROUND OF THE INVENTION

The present invention is directed to a system for separating a plastic waste from a paper waste. The system for separating a plastic waste from a paper waste of the present invention provides an easier and more productive way to separate plastic from paper.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
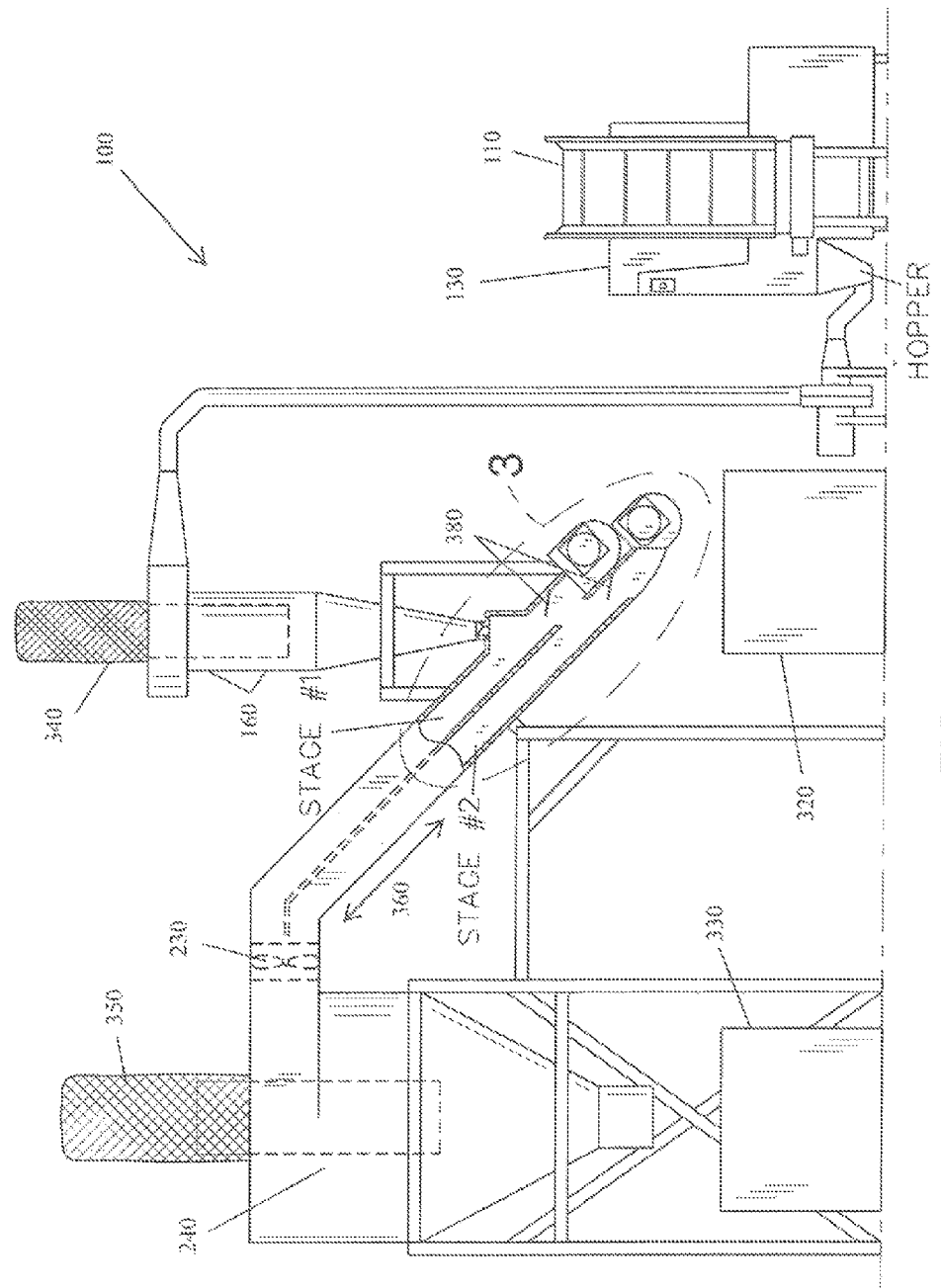
FIG. 1 shows a front view of a system for separating a plastic waste from a paper waste.
Figure 3:
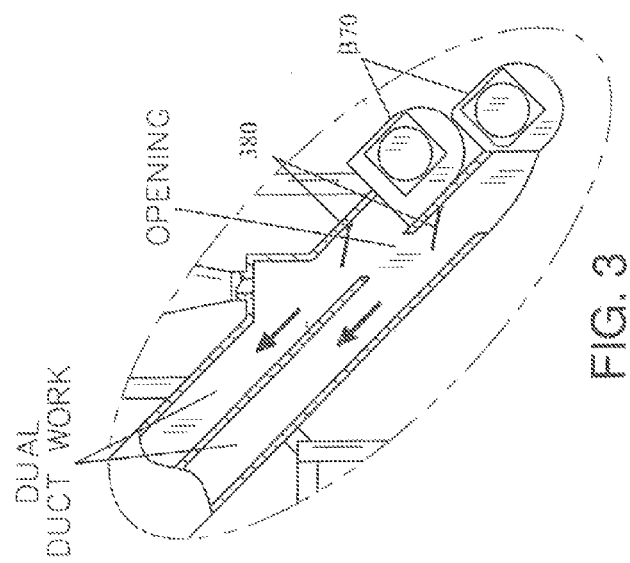
FIG. 3 shows an exploded partial view of the third tunnel of a system for separating a plastic waste from a paper waste.
Figure 2:
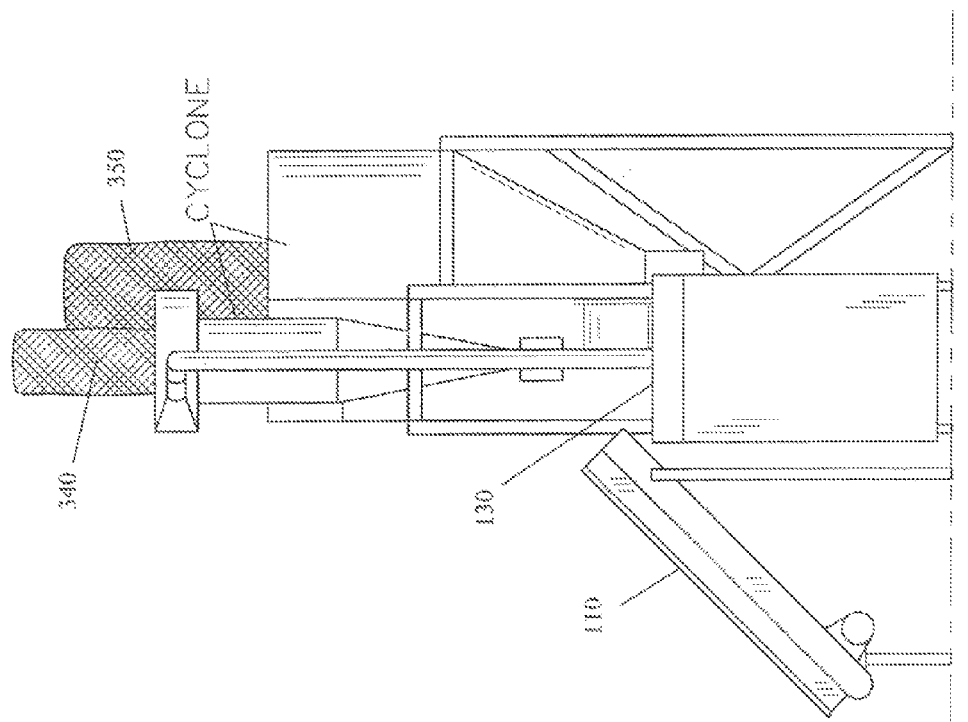
FIG. 2 shows a side view of a system for separating a plastic waste from a paper waste.
Figure 4:
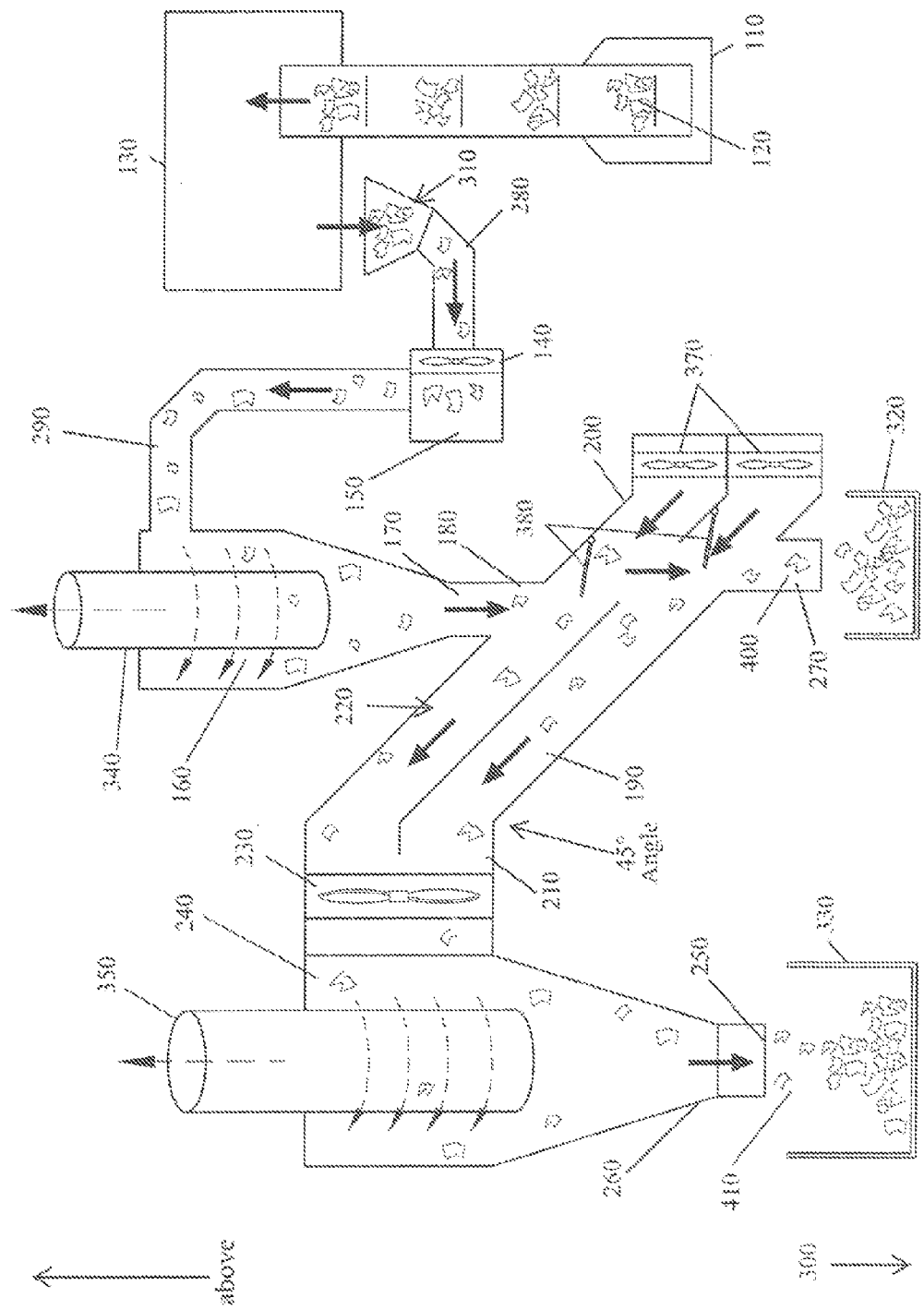
FIG. 4 shows a front view of a system for separating a plastic waste from a paper waste in use.

Referring now to FIGS. 1-4, the present invention features a system for separating a plastic waste from a paper waste 100, the system comprising a conveyor 110 for loading on a mixed-paper-and-plastic 120. The system further comprises a shredder 130 for shredding up the mixed-paper-and-plastic, a first fan 140, a first chamber 150, a first cyclone 160 having a first cyclone drop hole 170 disposed at a bottom 180 of the first cyclone.

The system further comprises a third tunnel 190 having a third tunnel lower end 200, a third tunnel upper end 210, and a third tunnel mid-section 220. The third tunnel mid-section fluidly connects with the first cyclone drop hole, a third fan 230, and a second cyclone 240 having a second cyclone drop hole 250 disposed at a bottom 260 of the second cyclone.

The system further comprises a plastic chute 270 fluidly connected to the third tunnel and extends downwardly toward the ground, and is disposed anywhere directly below the third tunnel and toward the lower end of the third tunnel.

The system further comprises a first tunnel 280 fluidly connecting the shredder and the first chamber. A second tunnel 290 fluidly connects the second chamber and the first cyclone, wherein the upper end of the third tunnel is located above the lower end of the third tunnel relative to a ground 300.

The first fan draws air toward the first chamber, the second fan blows air up the third tunnel from the lower third tunnel end toward the upper tunnel end, the third fan draws air into the second cyclone, wherein to separate the plastic waste 400 from the paper waste 410 in the mixed-paper-and-plastic. The mixed-paper-and-plastic is loaded onto the conveyer which is then fed into the shredder, then the shredder shreds the mixed-paper-and-plastic to form a mixed-shred 310 of shredded plastic and shredded paper. Next the mixed-shred is drawn into the first chamber, then the mixed-shred is drawn into the first cyclone wherein the cyclone loosens up the mixed-shreds and the shredded plastic and shredded paper slowly drops down the first cyclone drop hole of the first cyclone and into the mid-section of the third tunnel. As the shredded plastic enters the third tunnel the shredded plastic due to gravity continues to slide down toward the lower end of the third tunnel and falls into the plastic chute and into a shredded plastic box 320 (as the air flow created by the second fan and third fan is not strong enough to blow the shredded plastic upward). As the shredded paper enters the third tunnel the shredded paper is blown upward by the air flow of the second and third fan toward the upper end of the third tunnel. The shredded paper enters the second cyclone and eventually drops down through the second cyclone drop hole and is collected in a shredded paper box 330.

In some embodiments, the first cyclone further comprises a filter 340 disposed therein. In some embodiments, the second cyclone further comprises a filter 350 disposed therein.

In some embodiments, the third tunnel is angled at about 45 degrees.

In some embodiments, a portion of the third tunnel is bifurcated into two sections running along a length 360 of the third tunnel. In some embodiments, an air guide 380 is disposed within the third tunnel, the air guide is positioned between the first cyclone drop hole and the second fan.

In some embodiments, the second fan is a system of two fans 370.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

This system is easy to operate and is more productive in separating plastic from paper. Doing this job by hand can be very slow, and having this system would take less workers and would be a lot faster.

What is claimed is:

1. A system for separating a plastic waste from a paper waste (100), the system comprising:
   (a) a conveyor (110) for loading on a mixed-paper-and-plastic (120);
   (b) a shredder (130) for shredding up the mixed-paper-and-plastic, wherein the shredder (130) is disposed adjacent to the conveyor (110);
   (c) a first fan (140), wherein the first fan (140) is disposed adjacent to the shredder (130) via a first tunnel (280);
   (d) a first chamber (150), wherein the first chamber (150) is adjacent to the first fan (140);
   (e) a first cyclone (160) having a first cyclone drop hole (170) disposed at a bottom (180) of the first cyclone, wherein the first cyclone (160) is adjacent to the first chamber (150) via a second tunnel (290);
   (f) a third tunnel (190) having a third tunnel lower end (200), a third tunnel upper end (210), and a third tunnel mid-section (220), the third tunnel mid-section fluidly connects with the first cyclone drop hole (170), wherein the third tunnel (190) is adjacent to the first cyclone (160) via the first cyclone drop hole (170);

(g) a third fan (230), wherein the third fan (230) is adjacent to the third tunnel (190) via the third tunnel upper end (210);

(h) a second cyclone (240) having a second cyclone drop hole (250) disposed at a bottom (260) of the second cyclone, wherein the second cyclone (240) is adjacent to the third fan (230);

(i) a plastic chute (270) fluidly connected to the third tunnel and extends downwardly toward the ground, and is disposed anywhere directly below the third tunnel and toward the lower end of the third tunnel;

wherein a first tunnel (280) fluidly connects the shredder and the first chamber, a second tunnel (290) fluidly connects the first chamber and the first cyclone, wherein the upper end of the third tunnel is located above the lower end of the third tunnel relative to a ground (300), wherein the first fan draws air toward the first chamber, the second fan blows air up the third tunnel from the lower third tunnel end toward the upper tunnel end, the third fan draws air into the second cyclone, wherein to separate the plastic waste (400) from the paper waste (410) in the mixed-paper-and-plastic, the mixed-paper-and-plastic is loaded onto the conveyer which is then fed into the shredder, then the shredder shreds the mixed-paper-and-plastic to form a mixed-shred (310) of shredded plastic and shredded paper, then the mixed-shred is drawn into the first chamber, then the mixed-shred is drawn into the first cyclone wherein the cyclone loosens up the mixed-shreds and the shredded plastic and shredded paper slowly drops down the first cyclone drop hole of the first cyclone and into the mid-section of the third tunnel, then as the shredded plastic enters the third tunnel the shredded plastic due to gravity continues to slide down toward the lower end of the third tunnel and falls into the plastic chute and into a shredded plastic box (320) (as the air flow created by the second fan and third fan is not strong enough to blow the shredded plastic upward), and as the shredded paper enters the third tunnel the shredded paper is blown upward by the air flow of the second and third fan toward the upper end of the third tunnel, the shredded paper enters the second cyclone and eventually drops down through the second cyclone drop hole and is collected in a shredded paper box (330).

2. The system of claim 1 wherein the first cyclone further comprises a filter (340) disposed therein.

3. The system of claim 1 wherein the second cyclone further comprises a filter (350) disposed therein.

4. The system of claim 1 wherein the third tunnel is angled at about 45 degrees.

5. The system of claim 1 wherein a portion of the third tunnel is bifurcated into two sections running along a length (360) of the third tunnel.

6. The system of claim 1 wherein the second fan is a system of two fans (370).

7. The system of claim 1 wherein an air guide (380) is disposed within the third tunnel, the air guide is positioned between.

8. A system for separating a plastic waste from a paper waste (100), the system consisting of (a) a conveyor (110) for loading on a mixed-paper-and-plastic (120);

(b) a shredder (130) for shredding up the mixed-paper-and-plastic, wherein the shredder (130) is disposed adjacent to the conveyor (110);

(c) a first fan (140), wherein the first fan (140) is disposed adjacent to the shredder (130) via a first tunnel (280);

(d) a first chamber (150), wherein the first chamber (150) is adjacent to the first fan (140);

(e) a first cyclone (160) having a first cyclone drop hole (170) disposed at a bottom (180) of the first cyclone, wherein the first cyclone (160) is adjacent to the first chamber (150) via a second tunnel (290);

(f) a third tunnel (190) having a third tunnel lower end (200), a third tunnel upper end (210), and a third tunnel mid-section (220), the third tunnel mid-section fluidly connects with the first cyclone drop hole (170), wherein the third tunnel (190) is adjacent to the first cyclone (160) via the first cyclone drop hole (170);

(g) a third fan (230), wherein the third fan (230) is adjacent to the third tunnel (190) via the third tunnel upper end (210);

(h) a second cyclone (240) having a second cyclone drop hole (250) disposed at a bottom (260) of the second cyclone, wherein the second cyclone (240) is adjacent to the third fan (230);

(i) a plastic chute (270) fluidly connected to the third tunnel and extends downwardly toward the ground, and is disposed anywhere directly below the third tunnel and toward the lower end of the third tunnel;

wherein a first tunnel (280) fluidly connects the shredder and the first chamber, a second tunnel (290) fluidly connects the first chamber and the first cyclone, wherein the upper end of the third tunnel is located above the lower end of the third tunnel relative to a ground (300), wherein the first fan draws air toward the first chamber, the second fan blows air up the third tunnel from the lower third tunnel end toward the upper tunnel end, the third fan draws air into the second cyclone, wherein to separate the plastic waste (400) from the paper waste (410) in the mixed-paper-and-plastic, the mixed-paper-and-plastic is loaded onto the conveyer which is then fed into the shredder, then the shredder shreds the mixed-paper-and-plastic to form a mixed-shred (310) of shredded plastic and shredded paper, then the mixed-shred is drawn into the first chamber, then the mixed-shred is drawn into the first cyclone wherein the cyclone loosens up the mixed-shreds and the shredded plastic and shredded paper slowly drops down the first cyclone drop hole of the first cyclone and into the mid-section of the third tunnel, then as the shredded plastic enters the third tunnel the shredded plastic due to gravity continues to slide down toward the lower end of the third tunnel and falls into the plastic chute and into a shredded plastic box (320) (as the air flow created by the second fan and third fan is not strong enough to blow the shredded plastic upward), and as the shredded paper enters the third tunnel the shredded paper is blown upward by the air flow of the second and third fan toward the upper end of the third tunnel, the shredded paper enters the second cyclone and eventually drops down through the second cyclone drop hole and is collected in a shredded paper box (330).

\* \* \* \* \*